United States Patent
Yi et al.

(10) Patent No.: US 11,726,942 B2
(45) Date of Patent: Aug. 15, 2023

(54) MODULE ASSEMBLY AND MULTI-MASTER COMMUNICATION METHOD THEREOF

(71) Applicant: LUXROBO CO., LTD., Seoul (KR)

(72) Inventors: Gibag Yi, Seoul (KR); Seungbae Son, Seoul (KR)

(73) Assignee: LUXROBO CO., LTD., Seoul (KR)

(*) Notice: Subject to any disclaimer, the term of this patent is extended or adjusted under 35 U.S.C. 154(b) by 40 days.

(21) Appl. No.: 17/552,864

(22) Filed: Dec. 16, 2021

(65) Prior Publication Data

US 2022/0318177 A1 Oct. 6, 2022

Related U.S. Application Data

(63) Continuation of application No. PCT/KR2021/015291, filed on Oct. 28, 2021.

(30) Foreign Application Priority Data

Mar. 31, 2021 (KR) .......................... 10-2021-0041900

(51) Int. Cl.
*G06F 13/40* (2006.01)
*G06F 13/42* (2006.01)
(Continued)

(52) U.S. Cl.
CPC ...... *G06F 13/4068* (2013.01); *G06F 13/4031* (2013.01); *G06F 13/4247* (2013.01); *H04L 12/403* (2013.01); *H04L 12/40019* (2013.01); *H04L 12/40084* (2013.01); *A63H 33/04* (2013.01)

(58) Field of Classification Search
CPC ........ G06F 13/14; G06F 13/36; G06F 13/362; A63H 33/042; A63H 33/046; A63H 33/04
See application file for complete search history.

(56) References Cited

U.S. PATENT DOCUMENTS 7,322,873 B2 * 1/2008 Rosen .................. A63H 33/046
446/124
7,895,301 B1 * 2/2011 Mui .................... G06F 13/4286
446/454

(Continued)

FOREIGN PATENT DOCUMENTS

KR 1020170104306 A 9/2017

*Primary Examiner* — Brian T Misiura
(74) *Attorney, Agent, or Firm* — Birch, Stewart, Kolasch & Birch, LLP

(57) ABSTRACT

Disclosed are a module assembly and a multi-master communication method thereof, and more particularly, a module assembly including a plurality of modules capable of transmitting/receiving data by forming an open drain based one-wire communication bus upon mutual combination, in which at least one module requiring the data transmission among the plurality of modules performs first declaration for a transmission intention by outputting a low signal within a predetermined first arbitration time when at least one module is in an on state by sensing the one-wire communication bus state, at least one module performing the first declaration for the transmission intention performs second declaration for the transmission intention by outputting a high signal within a second arbitration time, and a module which outputs the high signal last within the second arbitration time secures final bus occupation.

20 Claims, 6 Drawing Sheets

(51) Int. Cl.
*H04L 12/40* (2006.01)
*H04L 12/403* (2006.01)
*A63H 33/04* (2006.01)

(56) References Cited

U.S. PATENT DOCUMENTS

| | | | | |
|---|---|---|---|---|
| 8,851,953 | B2* | 10/2014 | Oschuetz | A63H 33/042 |
| | | | | 446/124 |
| 9,524,148 | B1* | 12/2016 | Son | G06F 8/315 |
| 10,169,278 | B2* | 1/2019 | Mori | G06F 13/40 |
| 10,585,846 | B2* | 3/2020 | Wang | G06F 1/1698 |
| 10,758,836 | B2* | 9/2020 | Akishbekov | A63H 33/042 |
| 10,960,319 | B2* | 3/2021 | Zeng | G06F 13/4081 |
| 2012/0122059 | A1* | 5/2012 | Schweikardt | G09B 1/36 |
| | | | | 434/118 |
| 2017/0255458 | A1* | 9/2017 | Son | G06F 8/457 |

\* cited by examiner

MODULE ASSEMBLY AND MULTI-MASTER COMMUNICATION METHOD THEREOF

CROSS-REFERENCE TO RELATED APPLICATIONS

This application is a continuation of International Application No. PCT/KR2021/015291 filed on Oct. 28, 2021 which claims priority to and the benefit of Korean Patent Application No. 10-2021-0041900 filed in the Korean Intellectual Property Office on Mar. 31, 2021, the entire contents of which are incorporated herein by reference.

TECHNICAL FIELD

The present invention relates to a module assembly and a multi-master communication method thereof, and more particularly, to a module assembly and a multi-master communication method thereof which share a one-wire communication bus by combining a plurality of modules having a UART interface and arbitrate a transmission priority based on open drain characteristics to prevent a collision, thereby implementing multi-master communication.

BACKGROUND ART

In recent years, various module based fabricating tools for education, hobby, research, production, etc., have been proposed. Modules included in the fabricating tools may perform specific functions, respectively and are provided to be connected to each other to form a module assembly.

In this case, respective modules are provided to be also electrically connected to each other to transmit/receive energy, signals, data, etc. A user can fabricate a module assembly that performs a specific purpose by assembling modules according to a provided manual or an autonomously created scheme.

The module assembly performs data transmission/reception among a plurality of assembled modules to perform a specific purpose, and priority arbitration for bus sharing and bus occupation between modules is required for the data transmission/reception between the modules.

There are many cases of using CAN communication as a communication bus for data transmission/reception. As a patent document related to a module using the CAN communication, there is Korean Patent Unexamined Publication No. 2017-0104306 (hereinafter, referred to as Patent Document 1). In Patent Document 1, a specific module is operated as a master according to a predetermined priority based arbitration method according to a CAN communication scheme.

In general, the CAN communication has a predetermined priority for each module, and utilizes a scheme that provides a bus occupation right according to an order of declaring a transmission intention based on the priority. Therefore, the CAN communication is generally used when implementing multi-master communication.

In the case of using the CAN communication, it is easy to implement plug and play between the modules, it is easy to implement a broadcasting network, and a system control speed and stability can be enhanced with high reliability.

In order to apply the CAN communication, processing performance of the module should be supported. However, a module assembly using a low-performance processor is difficult to utilize the CAN communication due to a performance constraint by considering a price and a function, and cost remarkably increases when applying the CAN communication.

Therefore, a method is required, which can implement the multi-master communication through bus occupation arbitration even in a situation in which the processing performance of the module, etc., is insufficient.

SUMMARY OF THE INVENTION

The present invention has been made in an effort to provide a module assembly and a multi-master communication method thereof which share a one-wire communication bus by combining a plurality of modules having a UART interface and arbitrate a transmission priority based on open drain characteristics to prevent a collision, thereby implementing multi-master communication.

An exemplary embodiment of the present invention provides a module assembly which may include a plurality of modules capable of transmitting/receiving data by forming an open drain based one-wire communication bus upon mutual combination.

At least one module requiring the data transmission/reception among the plurality of modules may perform first declaration for a transmission intention by outputting a low signal within a predetermined first arbitration time when at least one module is in an on state by sensing the one-wire communication bus state, at least one module performing the first declaration for the transmission intention may perform second declaration for the transmission intention by outputting a high signal within a second arbitration time, and a module which outputs the high signal last within the second arbitration time may secure final bus occupation.

Each module may include a processor outputting a control signal for the first declaration and the second declaration when there is data to be transmitted, and a communication unit outputting a low signal or a high signal within an arbitration time by switching the one-wire communication bus connection according to the output control signal.

An input/output terminal of the communication unit may be configured by an open drain.

When the communication unit receives a high-level control signal from the processor, the communication unit is turned on to output the low signal.

When the communication unit receives a low-level control signal from the processor, the communication unit is turned off to output the high signal.

When at least one module outputs the low signal, the one-wire communication bus may become a ground state.

When all of the plurality of modules outputs the high signal, the one-wire communication bus may become an on state.

All of the plurality of modules may be configured to output the high signal upon start of the first arbitration time, and when a one-wire bus state becomes the ground state by the first declaration, a module which does not declare a transmission intention may maintain the high signal for the first arbitration time and the second arbitration time.

A module securing the final bus occupation may transmit transmission data to another module through the one-wire communication bus, and another module may discard the received data when destination information of the data received from the module securing the final bus occupation is not the same as an ID of another module.

The plurality of modules may become a master module, and transmit/receive data by using a data frame including a start section (SoF), a control section, a data section, a CRC section, an ACK section, and an arbitration section in order.

The communication unit may become a UART communication interface.

Another exemplary embodiment of the present invention provides a multi-master communication method of a module assembly including a plurality of modules capable of transmitting/receiving data by forming an open drain based one-wire communication bus upon mutual combination, which may include: performing, by at least one module requiring data transmission among the plurality of modules, first declaration for a transmission intention by outputting a low signal within a predetermined first arbitration time when being in an on state by sensing the one-wire communication bus state; performing, by at least one module performing the first declaration for the transmission intention, second declaration for the transmission intention by outputting a high signal within a second arbitration time; and a bus occupation step of securing, by a module which outputs the high signal last within the second arbitration time, final bus occupation.

The plurality of modules may include a processor and a communication unit in which an input/output terminal is configured by an open drain, and the performing of the first declaration for the transmission intention may include, in each of at least one module requiring the data transmission, outputting, by the processor, the high signal for the first declaration within the first arbitration time when being in an on state by monitoring the one-wire communication bus when there is data to be transmitted, and outputting, by the communication unit, the low signal as being turned on according to the high signal output from the processor.

The performing of the second declaration for the transmission intention may include outputting, by the processor, the low signal for the second declaration within the second arbitration time, and outputting, by the communication unit, the high signal as being turned off according to the low signal output from the processor.

When at least one module outputs the low signal, the one-wire communication bus may become a ground state.

When all of the plurality of modules outputs the high signal, the one-wire communication bus may become an on state.

All of the plurality of modules may be configured to output the high signal upon start of the first arbitration time, and when a one-wire bus state becomes the ground state by the first declaration, a module which does not declare a transmission intention may maintain the high signal for the first arbitration time and the second arbitration time.

The method may further include: transmitting, by a module securing the final bus occupation, transmission data to another module through the one-wire communication bus; and discarding, by another module, the received data when destination information of the data received from the module securing the final bus occupation is not the same as an ID of another module.

The plurality of modules may become a master module, and transmit/receive data by using a data frame including a start section (SoF), a control section, a data section, a CRC section, an ACK section, and an arbitration section in order.

The communication unit may become a UART communication interface.

According to an exemplary embodiment of the present invention, a module assembly and a multi-master communication method thereof share a one-wire communication bus by combining a plurality of modules having a UART interface and arbitrate a transmission priority based on open drain characteristics to prevent a collision, thereby implementing multi-master communication.

Therefore, the multi-master communication through the transmission priority arbitration can be implemented without implementing the CAN communication, and the price of the module can also be reduced.

It is difficult to determine an accurate bus occupation module due to a limitation in processing speed of the module upon performing only a first arbitration, but in a exemplary embodiment of the present invention, a bus can be occupied by one module by performing the first arbitration and a second arbitration based on the open drain characteristics, thereby overcoming the limitation in processing speed.

An arbitration section is provided in a last section of a data frame, and as a result, the bus can be turned on by a module (bus occupation right securing module) outputting a last high signal upon the second arbitration and the module which secures a bus occupation right can transmit the data frame through a sharing bus.

An inter-module sharing bus is formed through hardware combination such as fitting, contact, etc., and an open drain to easily add and remove the module used for the multi-master communication.

The effects according to the present invention are not limited by the contents exemplified above, and more various effects are included in the present specification.

DETAILED DESCRIPTION

The following description illustrates only a principle of the present invention. Therefore, those skilled in the art may implement the principle of the present invention and invent various apparatuses included in the concept and the scope of the present invention although not clearly described or illustrated in the present specification. In addition, it is to be understood that all conditional terms and embodiments mentioned in the present specification are obviously intended only to allow those skilled in the art to understand a concept of the present invention in principle, and the present invention is not limited to embodiments and states particularly mentioned as such.

In the following description, ordinal number expressions such as first, second, etc., are used for describing equal or independent objects and should be appreciated that there is no meaning of main/sub or master/slave in the order.

The above-mentioned objects, features, and advantages will become more obvious from the following detailed description associated with the accompanying drawings. Therefore, those skilled in the art to which the present invention pertains may easily practice a technical idea of the present invention.

The features of various embodiments of the present disclosure can be partially or entirely bonded to or combined with each other and can be interlocked and operated in technically various ways so as to be sufficiently appreciated by those skilled in the art, and the embodiments can be carried out independently of or in association with each other.

Hereinafter, various exemplary embodiments of the present invention will be described in detail with reference to the accompanying drawings.

Figure 1:
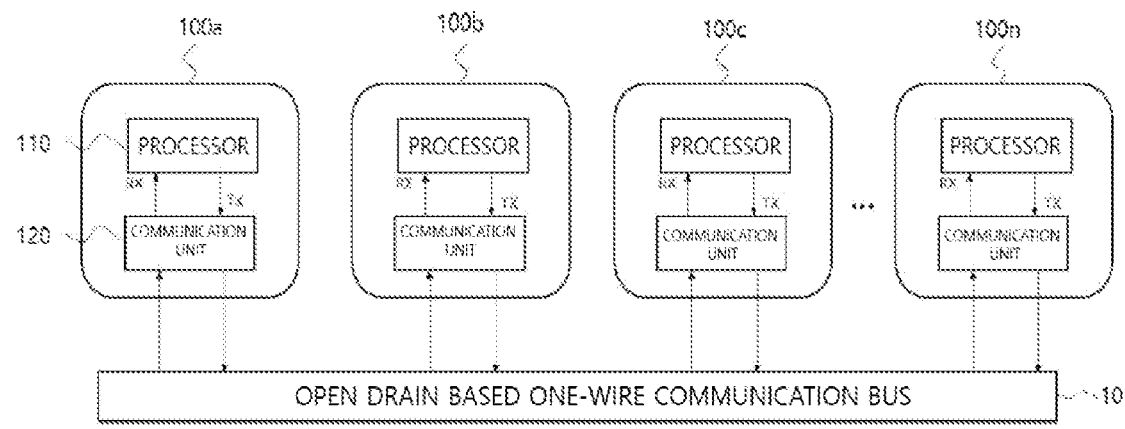
FIG. 1 is a block diagram illustrating a schematic configuration of a module assembly according to an exemplary embodiment of the present invention.

FIG. 1 is a block diagram illustrating a schematic configuration of a module assembly according to an exemplary embodiment of the present invention. The module assembly according to an exemplary embodiment of the present invention may include a plurality of modules 100a to 100n capable of transmitting/receiving data by forming an open drain based one-wire communication bus 10 upon mutual combination.

The respective modules 100a to 100n may include a processor 110 and a communication unit 120, and the communication unit 120 may become a UART interface, and an input/output terminal may be constituted by an open drain.

In this case, the processor 110 and the communication unit 120 may be implemented as one microprocessor, and when the microprocessor does not constitute the open drain, the microprocessor may be separately provided and connected.

The module assembly according to an exemplary embodiment of the present invention determines a transmission module by performing a bus occupation arbitration in each module to implement multi-master communication. For understanding of a description thereof, prior to describing a bus occupation arbitration method which is a main feature of the present invention, a structure of the module and inter-module combination according to an exemplary embodiment of the present invention will be described through FIGS. 2 and 3, and open drain characteristics of the communication unit according to an exemplary embodiment of the present invention will be described first through FIGS. 4 and 5.

Figure 2:
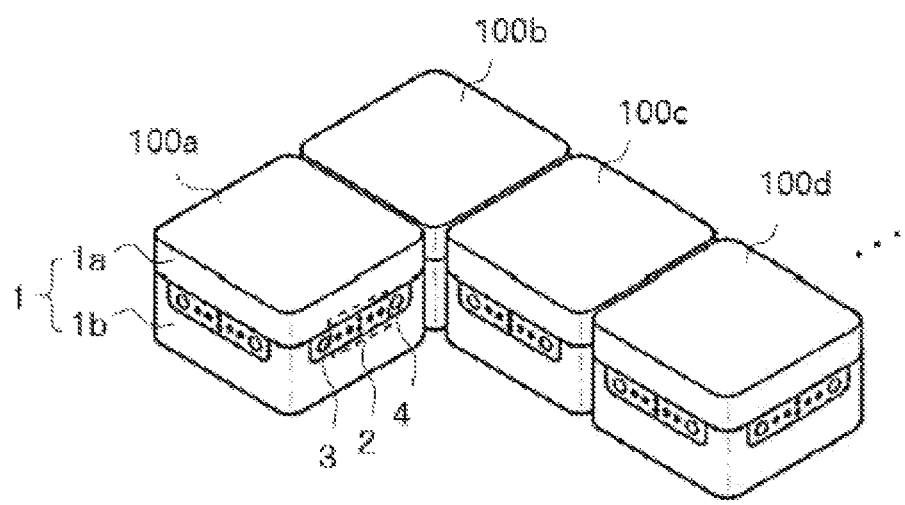
FIG. 2 is a perspective view illustrating a state where the module assembly of FIG. 1 is assembled.
Figure 3:
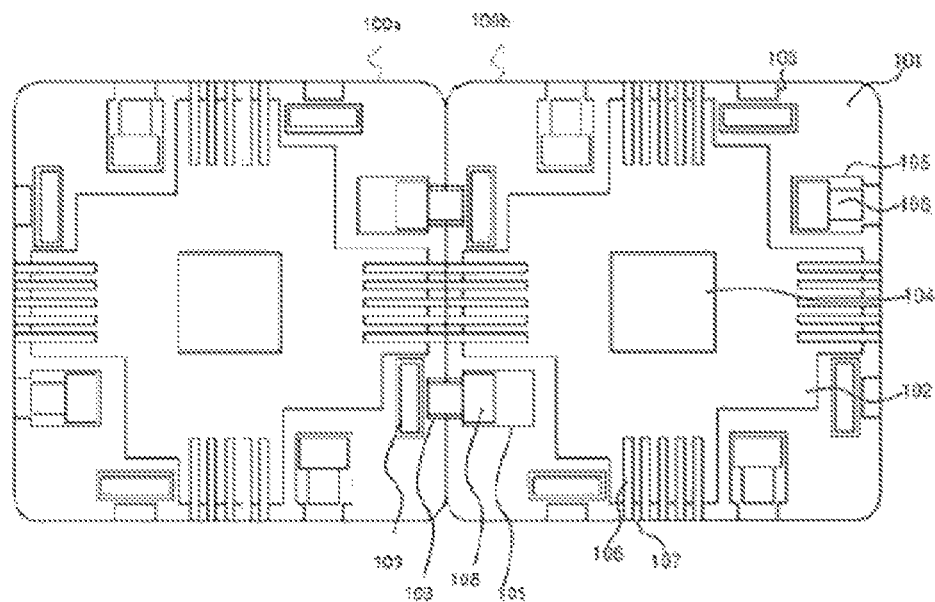
FIG. 3 is a plan view illustrating an internal structure of a partially combined module in the module assembly of FIG. 2.

FIG. 2 is a perspective view illustrating a state where the module assembly of FIG. 1 is assembled and FIG. 3 is a plan view illustrating an internal structure of a partially combined module in the module assembly of FIG. 2. Through FIGS. 2 and 3, it can be seen that the one-wire communication bus 10 is formed through the structure of each of the modules 100a to 100n and the inter-module combination.

The module assembly may be defined as a set of the plurality of modules 100a to 100n which may be assembled to each other or a structure in which the modules 100a to 100n are assembled and is not limited by a purpose, a type, a form, the number of modules, etc.

The plurality of modules 100a to 100n may be defined as objects configured to transmit and receive a signal, data, or electrical energy (hereinafter, an 'electrical signal') represented as a change in voltage or current to and from another module or an external device. The modules include a central processing unit (CPU), a memory 316, a power supply, etc., or a sensing means, a processing means, a driving means, etc., which is operable by being controlled by another module to be independently driven, respectively.

The respective modules 100a to 100n may be configured to independently perform specific functions or perform specific functions by interaction with another module. When the modules include a central processing unit (CPU), firmware may be installed for each module.

As described above, the respective modules 100a to 100n may be broadly classified into an input module, an output module, and a setup module.

Here, the input module may be constituted by an infrared (IR) module capable of receiving an infrared signal from a remote controller, etc., a gyroscope sensor module capable of sensing X, Y, and Z-axis change angles and acceleration, a dial module capable of measuring a rotational angle or a rotational speed using rotation of a module handle, a button module capable of sensing pressing of a button, sensing click, double-click, and pressed states, and maintaining an on/off state using toggle, an environment module capable of measuring a temperature, humidity, illuminance, etc., a mic module capable of sensing ambient sound intensity (dB) and a frequency, and an ultrasonic module capable of sensing a distance.

The output module may be constituted by an LED module capable of visual displaying depending on a color change, a speaker module, a display module displaying a picture drawn by the user, a text, or module information on a screen, a motor controller module setting a speed, an angle, and a torque and sending the electrical signal to a motor module, and rotating the motor module, or a motor module (motor; MDP-14) capable of converting the electrical signal received from the motor controller into a rotational motion.

The setup module may be constituted by a battery module used when supplying power to another module and a network module capable of connecting the module to a PC, a smart phone, or the module through Bluetooth, WiFi, or USB connection.

The respective modules 100a to 100n may also be connected to an external driving device by a cable. In this case, the module assembly 300 may be a device that selectively actuates the motor by receiving the signal of the remote controller or the smart phone.

A configuration of the module assembly is just one example and the respective modules 100a to 100n may be provided to perform an arbitrary function independently or through interlocking with another module.

The plurality of modules 100a to 100n may be a cube having a polygonal pillar shape having a plurality of lateral surfaces which may be in face contact with another neighboring module. Here, it should be appreciated that face contact does not mean only that all dimensions of lateral surfaces contact each other and should be appreciated as a meaning including a case where only some of the lateral surfaces contact and the lateral surface of any one module and the lateral surface of another module partially contact each other while facing each other.

Referring to FIG. 2, it is illustrated as an example that the respective modules 100a to 100n have a plane having a square shape, but the respective modules 100a to 100n may be formed in polygonal pillar shapes including a square, a rectangle, a regular pentagon, etc., on the plane, and in particular, may also be formed in a regular polygonal shape. Some modules may have different three-dimensional shapes. Further, some of the modules may have various stereoscopic shapes including a cone, a polyhedron, and the like.

Each of the modules 100a to 100n may include a housing 1 forming an exterior, a terminal 2 which is exposed to the lateral surface of the housing 1 to transfer or receive the electrical signal to another connected module, a pin installation portion 105 where a combination pin (3 of FIG. 2 or 108 of FIG. 3) which selectively protrudes to the outside of housing is provided, and a pin receiving portion (4 of FIG. 2 or 103 of FIG. 3) into which a combination pin of another module is inserted.

Here, the combination pin 108, the pin installation portion 105, and the pin receiving portion (4 of FIG. 2 or 103 of FIG. 3) are provided as combination mechanisms for interconnecting two adjacent modules. In the exemplary embodiment of FIG. 3, the combination pin 108 provided on a lateral surface of a body case 1b and a magnet 109 for pulling the combination pin 108 by magnetic force may be provided. Due to the combination pin 108 and the magnet 109, two modules disposed at adjacent locations may be mutually pulled and combined by the magnetic force. In the exemplary embodiment, the combination pin 108 and the magnet 109 are described as an example as the combination mechanism, but not limited thereto, and a combination mechanism of another scheme may also be used. For example, a protrusion and an indented portion receiving the protrusion are provided in the body case 1b to combine two modules by a scheme of mutually combining the protrusion and the indented portion of two neighboring modules.

A housing 1 as a case formed in a rectangular parallelepiped shape in which a plane is square protects internal components. As illustrated in FIG. 2, the housing 1 may be provided in a form in which an upper case 1a and a lower case 1b are combined with each other. In a method for configuring the housing 1, the upper case 1a and the lower case 1b may be integrally formed or divided into more parts and assembled as necessary.

The lower case 1b may include a frame forming the exterior and the internal structure, a substrate 102 provided inside the frame, and a functional unit 104 installed on the substrate 102. More specifically, the functional unit 104 for implementing the function of the first module 100a may be mounted on the substrate 102 and may be fixedly installed in an inner space center of the frame. The functional unit 104 may become, for example, the microprocessor including the processor 110 and the communication unit 120 according to an exemplary embodiment of the present invention, and the type of (the input module, the output module, and the setup module) of module may be determined according to the function.

Other more detailed structures and combinations of the modules of the present invention are disclosed in detail in Korean Patent No. 10-1761596 and included in the specification of the present invention by reference.

A terminal 2 may transfer the electrical signal to another connected module or receive the electrical signal from another module and as one example, may receive the electrical signal from a substrate 102 provided in the housing 1 and transfer the electrical signal to the terminal of another module which contacts the terminal. The terminal 2 may have multiple contact points or connection pins and may have various shapes according to a transferring method of the electrical signal, a standardized specification, and the like.

Such a terminal 2 may be disposed on one lateral surface of the housing 1 by forming one set with the pin (3 of FIG. 2 or 106 of FIG. 3), the pin installation portion 105, and the pin receiving portion (4 of FIG. 2 or 103 of FIG. 3). Specifically, the terminal 2 may be disposed between the pin (3 of FIG. 2 or 106 of FIG. 3) and the pin receiving portion (4 of FIG. 2 or 103 of FIG. 3) and may contact the terminal disposed between the pin and the pin receiving portion of another module. In the exemplary embodiment, it is described as an example that the terminal 2 is provided on all lateral surfaces of the housing 1, but there may be a lateral surface without the terminal 2 in some exemplary embodiments.

In this case, in an exemplary embodiment of the present invention, a UART terminal may be used, and the UART terminal is configured by the open drain to form the open drain based one-wire communication bus 10 upon hardware combination between the modules as in FIG. 3. For example, in the modules 100a to 100n, one of the pins 106 of the terminal 2 may become an open drain output pin, and the pins 106 of the terminal 2 of each module are interconnected to form and share the one-wire communication bus 10.

The frame as a structure that configures a part or the entirety of the housing 1 may form the exterior of a part or the entirety of the housing 1 and provide a space and a structure for installing various components therein. In the exemplary embodiment, it is described as an example that the frame forms the lower case 1b of the housing 1, and formed in a rectangular shape, and has four corners, but the scope of the present invention is not limited thereto.

As in FIGS. 2 and 3 above, in the module assembly according to an exemplary embodiment of the present invention, the plurality of modules 100a to 100n connects an open drain output of the communication unit 120 through the hardware combination to form a sharing bus 10. Therefore, it is easy to add and remove the module used for the multi-master communication.

In an exemplary embodiment of the present invention, the communication unit 120 may become a UART communication interface, and output data and a control signal received from the processor 110 to Tx (transmitting unit) and transmit the data and the control signal to another module through the one-wire communication bus 10, and receive the data transmitted from the processor 110 of another module through the one-wire communication bus 10 through Rx (receiving unit).

In this case, the Tx (transmitting unit) and the Rx (receiving unit) of the communication unit 120 may be formed as one line, and may operate as the Tx (transmitting unit) and the Rx (receiving unit) according to the control of the processor 110 of the corresponding module of the communication unit 120, and the transmitted and received data may be written to or read from a buffer of the communication unit 120.

In an exemplary embodiment of the present invention, the input/output terminal of the communication unit 120 may be implemented as the open drain. That is, the buffer of the communication unit 120 may become an open drain buffer.

Through FIGS. 4A, 4B and 5, the characteristics of the open drain applied to the communication unit according to an exemplary embodiment of the present invention will be described.

Figure 4A:
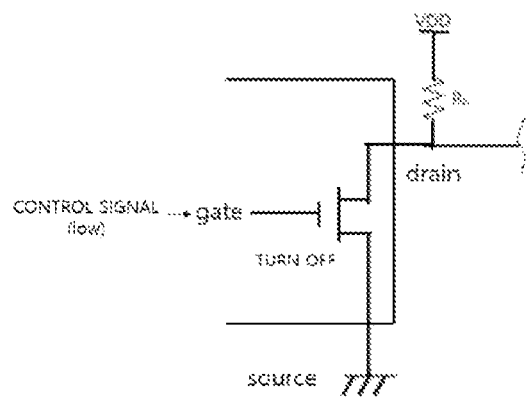
FIGS. 4A and 4B are diagrams for describing characteristics of an open drain applied to a communication unit according to an exemplary embodiment of the present invention.
Figure 4B:
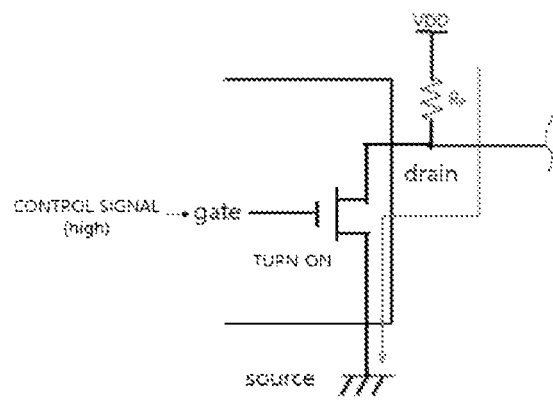

FIGS. 4A and 4B are diagrams for describing characteristics of an open drain applied to a communication unit according to an exemplary embodiment of the present invention. Referring to FIGS. 4A and 4B, the control signal of the processor 110 may be input into a gate, and a MOSFET is turned on or turned off according to a level of the control signal to determine a drain output. Further, the drain output of the open drain may be connected to the drain output of another module.

In FIG. 4A, a low signal is input as the control signal and the MOSFET is turned off, and as a result, external power VDD is connected through a pull-up resistor Rp and the drain output becomes logic '1', i.e., a high signal. Meanwhile, in FIG. 4B, the high signal is input as the control signal and the MOSFET is turned on, and as a result, the drain output is connected to a ground by the pull-up resistor and the drain output becomes logic '0', i.e., a low signal.

That is, when the communication unit 120 of each module receives a high-level control signal from the processor 110 through the open drain structure, the communication unit 120 is turned on to output the low signal and when the communication unit 120 receives a low-level control signal from the processor 110, the communication unit 120 is turned off to output the high signal.

Figure 5:
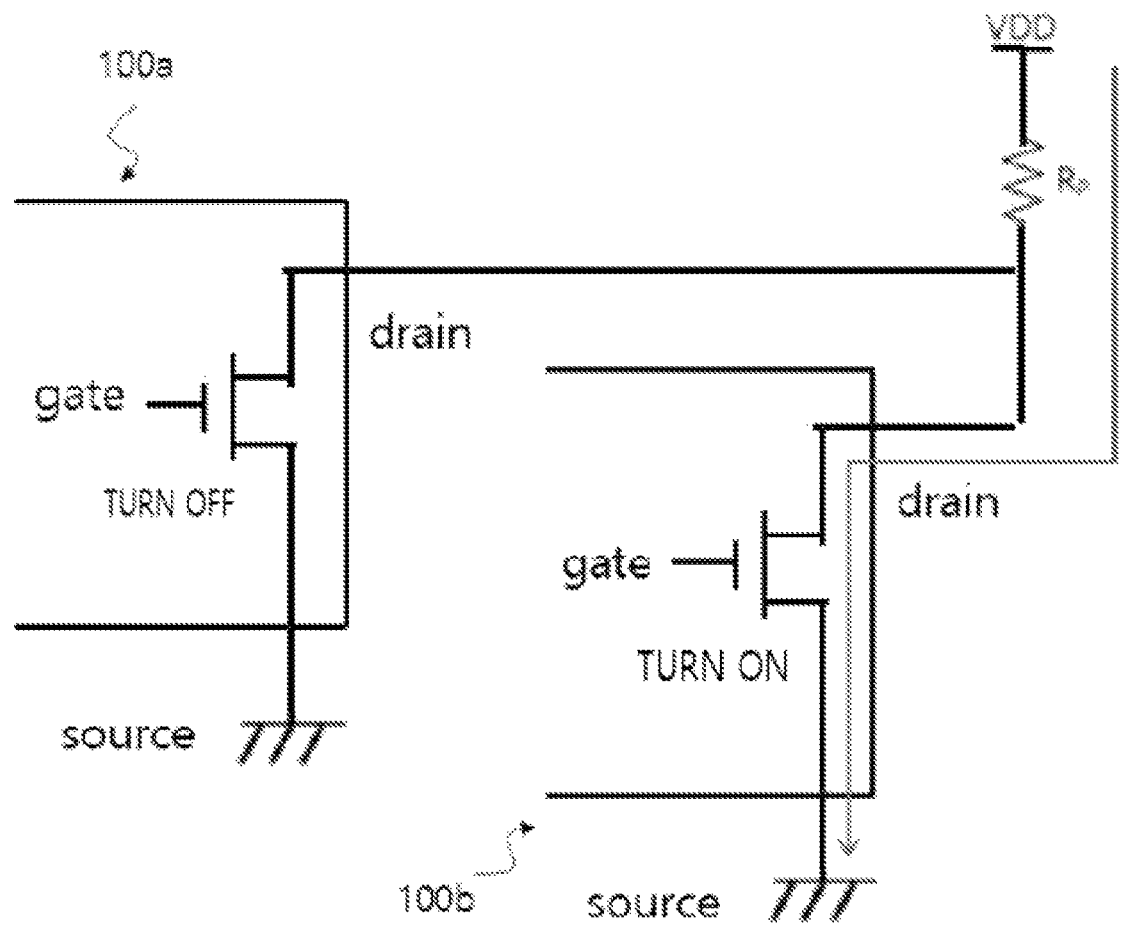
FIG. 5 is a diagram for describing characteristics of an open drain forming a one-wire communication bus according to an exemplary embodiment of the present invention.

FIG. 5 is a diagram for describing characteristics of an open drain forming a one-wire communication bus according to an exemplary embodiment of the present invention. In FIG. 5, open drain outputs of a plurality of modules 100a and 100b are connected to each other to form the one-wire communication bus. In FIG. 5, for understanding of the description, the characteristics are described by connecting two modules, but a drain output of an additional module may be connected by the same method.

Referring to FIG. 5, two outputs in which the open drain buffer of the first module 100a is in an off state and the open drain buffer of the second module 100b is in an on state are connected to each other to form the one-wire communication bus. In this case, the first module 100a outputs logic '1', i.e., the high signal to be separated from a circuit of the first module. Therefore, the first module 100a does not influence the output of the second module 100b, and the second module 100b serves to discharge current which flows in from the external power through the pull-up resistor.

That is, since the first module 100a does not influence the output, a logic of the one-wire communication bus formed by connecting the open drain outputs of the first module 100a and the second module 100b becomes '0', i.e., low.

As such, the one-wire communication bus 10 connecting the open drain outputs according to an exemplary embodiment of the present invention becomes a ground state when at least one connected module outputs logic '0', i.e., the low signal, and when all of the plurality of modules 100a to 100n outputs logic '1', i.e., the high signal, the one-wire communication bus 10 becomes an on state.

As in FIGS. 2 to 5 above, in order to perform the multi-master communication by using the open drain based one-wire communication bus connecting the open drain outputs, each of the modules 100a to 100n of the module assembly according to an exemplary embodiment of the present invention may participate in a first arbitration and a second arbitration of performing a transmission intention declaration for securing bus occupation.

Here, the first arbitration may be a process in which a module performing a first declaration for the transmission intention within a first arbitration time becomes a transmission priority candidate, and the second arbitration may be a process in which at least one module as the transmission priority candidate within a second arbitration time subsequent to the first arbitration time performs a second declaration for the transmission intention for final bus occupation.

Each of the plurality of modules 100a to 100n according to an exemplary embodiment of the present invention may output a control signal for declaring the transmission intention in the processor 110, and the communication unit 120 may perform an operation for the bus occupation by switching the connection of the one-wire communication bus 10 according to control signal the processor 110 in order to transmit data through the one-wire communication bus 10.

Specifically, at least one module requiring data transmission among the plurality of modules 100a to 100n outputs the low signal within a predetermined first arbitration time by sensing a state of the one-wire communication bus 10 to perform the first declaration for the transmission intention.

In this case, when the one-wire communication bus 10 is in on the state, the module that performs the first declaration for the transmission intention may become the transmission priority candidate. The module which becomes the transmission priority candidate may particulate in the second arbitration for the bus occupation, and a module which does not become the transmission priority candidate becomes a receiving module that is eliminated from the bus occupation and receives data.

Next, at least module which becomes the transmission priority candidate may perform the second declaration for the transmission intention by outputting the high signal within the second arbitration time, and a module that outputs the high signal last within the second arbitration time may finally secure the bus occupation.

That is, while the bus is turned on by the module (bus occupation securing module) that outputs the high signal last within the second arbitration time, the bus occupation securing module may become a transmission module that transmits a data frame.

Figure 6:
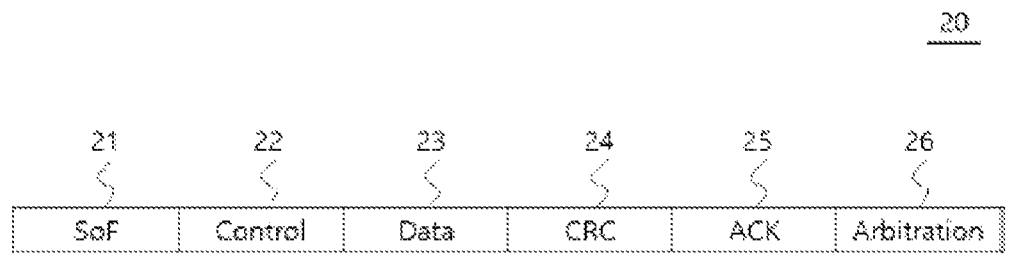
FIG. 6 is a diagram illustrating a transmission frame according to an exemplary embodiment of the present invention.
Figure 7:
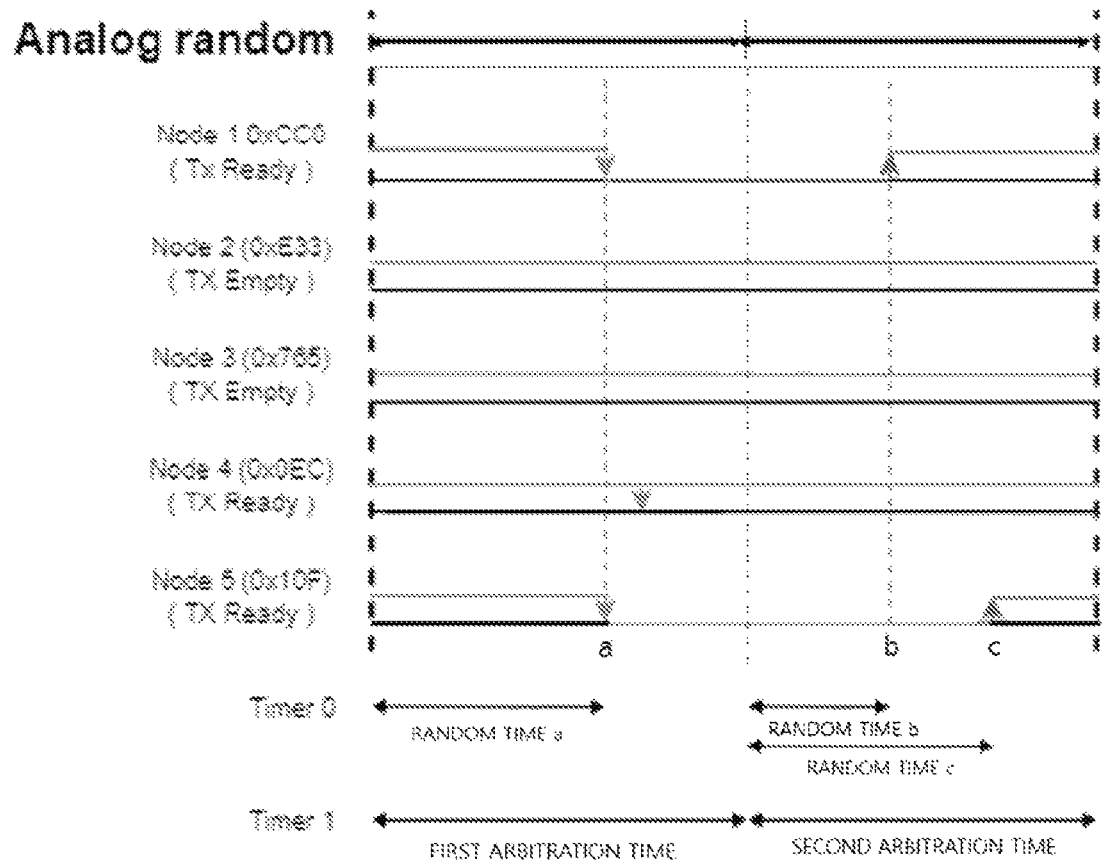
FIG. 7 is a time table of an arbitration section for describing a bus occupation arbitration of a module assembly according to an exemplary embodiment of the present invention.
Figure 8:
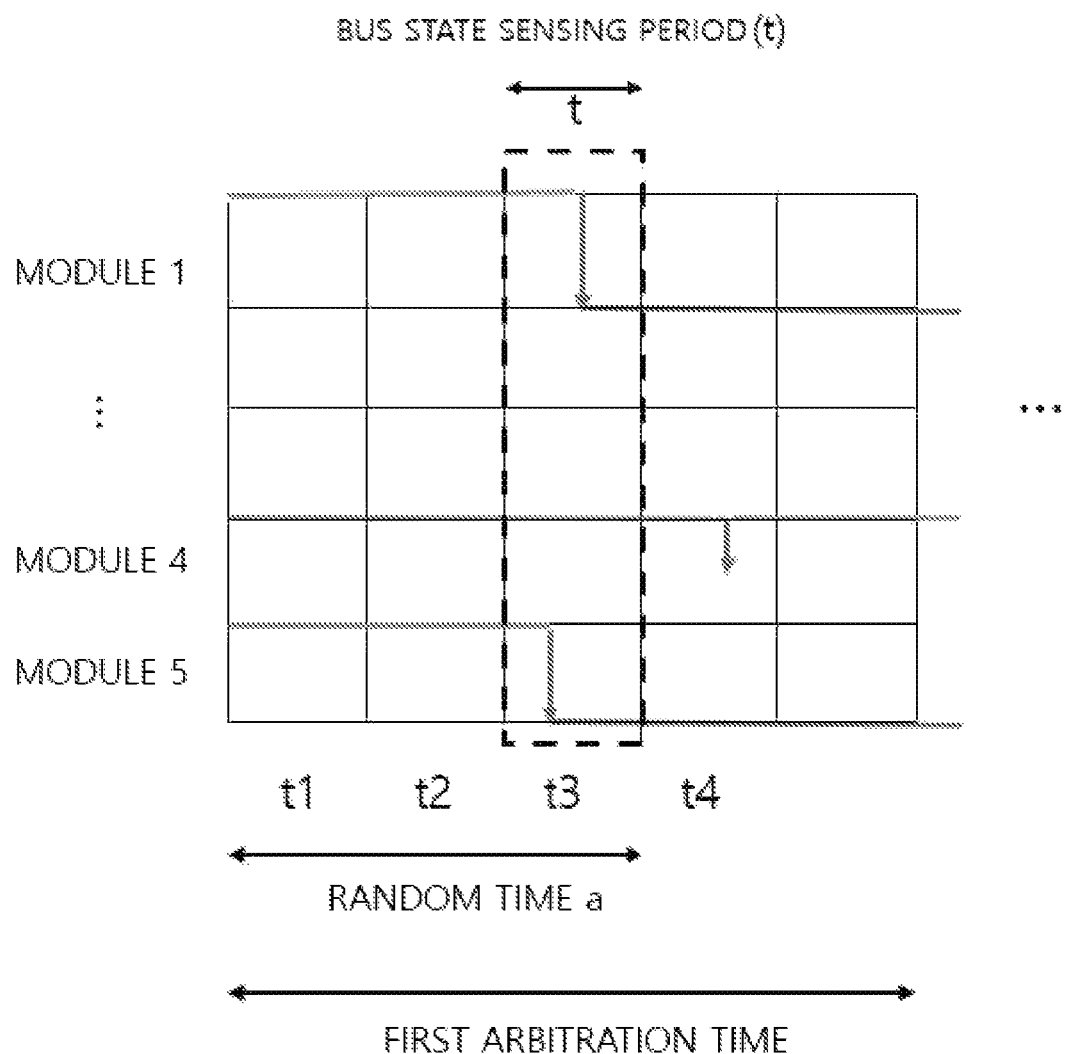
FIG. 8 is a time table for describing a priority candidate which performs a first declaration for a transmission intention at a first arbitration time of FIG. 7.

Through FIGS. 7 and 8, the transmission declaration of each module for the bus occupation of the multi-master communication according to an exemplary embodiment of the present invention may be described. In this case, the module assembly according to an exemplary embodiment of the present invention may perform data transmission/reception by using the data frame illustrated in FIG. 6 based on a UART specification by using UART which is asynchronous serial communication. The module assembly may be modified and applied according to an intention of a designer.

The UART as a kind of computer or peripheral device is generally an individual integrated circuit which serializes and communicates parallel data, and is generally included in an MCU. Since the UART is asynchronous communication, a synchronization signal is not forwarded. Accordingly, a receiving side is promised to temporally take care of a start and an end of data itself by finding the synchronization signal. To this end, a section for notifying the start and the end is required in the data frame.

FIG. 6 is a diagram illustrating a transmission frame according to an exemplary embodiment of the present invention.

In an exemplary embodiment of the present invention, the plurality of modules 100a to 100n may transmit/receive data by using the data frame 20 including a start section (SoF) 21, a control section 22, a data section 23, a CRC section 24, an ACK section 25, and an arbitration section 26 in order as illustrated in FIG. 6.

Here, the start section 21 means the start of the frame, and indicates that one bit time length is maintained and communication is started according to a predetermined promise.

The control section 22 may become a section that transmits a length of data, a CRC length, and a control signal.

The data section 23 may include an ID of the module transmitted to a data area to be transmitted, an ID of a destination module, and the data area.

The CRC section 24 may becomes a section for confirming an integrity of the data frame.

The ACK section 25 is a section in which a response of a receiving module for data reception is transmitted.

The arbitration section 26 is a section for determining a module that is to transmit next data through the bus occupation upon termination of the corresponding data frame. Further, the arbitration section 26 may notify termination of communication with an end bit indicating the end of the data frame.

The arbitration section 26 according to an exemplary embodiment of the present invention may be described through FIGS. 7 and 8. FIG. 7 is a time table of an arbitration section for describing a bus occupation arbitration of a module assembly according to an exemplary embodiment of the present invention. FIG. 8 is a time table for describing a priority candidate which performs a first declaration for a transmission intention at a first arbitration time of FIG. 7.

All of the plurality of modules 100a to 100n according to an exemplary embodiment of the present invention may be configured to output the high signal when the first arbitration time starts, i.e. when the ACK section ends.

Referring to FIG. 7, the arbitration section according to an exemplary embodiment of the present invention is divided into a first arbitration time and a second arbitration time, and determines a transmission module which is to transmit next data.

If the module assembly includes module 1 to module 5, all of module 1 to module 5 are set to the high signal uplink the start of the arbitration section, and modules 1, 4, and 5 with data to be transmitted among modules 1 to 5 may perform the first declaration for the transmission intention by outputting the low signal within the first arbitration time. In this case, the processor 110 of each module may control the communication unit 120 to output the low signal when the state of the one-wire communication bus is on while monitoring the state (on or ground) of the one-wire communication bus.

Referring to FIG. 7, it may be verified that modules 1 and 5 output the low signal at random time a. In this case, since the processor 110 monitors the state of the one-wire communication bus at a predetermined bus state sensing period, the bus state sensing period may vary depending on performance. The processor 110 senses the bus state in units of the bus state sensing period (t of FIG. 8) as illustrated in FIG. 8, and when sensing the bus is in the on state, the processor 110 controls the low signal to be output through the communication unit 120 within the first arbitration time.

Therefore, module 5 actually grips a key first, but a bus on state is verified at bus state sensing period t2, and modules 1 and 5 that output the low signal at t3 may determine that the bus is switched to a ground state by outputting the low signal thereof.

Therefore, in an exemplary embodiment of the present invention the second arbitration is performed within the second arbitration time in order to determine an accurate bus occupation module. Modules 1 and 5 that perform the first declaration for the transmission intention by outputting the low signal in the bus on state becomes the transmission priority candidate to participate in the second arbitration.

Meanwhile, module 4 attempts to output the low signal while monitoring the bus state for the transmission declaration, but the bus state already becomes the ground state before declaring the transmission intention and does not output the low signal and maintains the high signal.

Modules 2 and 3 without the transmission intention also maintain the high signal.

Consequently, in the first arbitration, modules 1 and 5 output the low signal at the same time zone (random time a of FIG. 7, t3 of FIG. 8) for the first arbitration time to become the transmission priority candidate, and the bus state may become the ground state.

Next, the modules 1 and 5 which become the transmission priority candidate output the high signal within the second arbitration time to perform the second declaration for the transmission intention. In this case, the bus state of the open drain based one-wire communication bus becomes the ground state when at least one module of all connected modules outputs the low signal. Referring to the second arbitration time of FIG. 7, when module 1 outputs the high signal earlier than module 5, module 5 outputs the low signal, and as a result, the bus state maintains the ground state.

The bus state of the open drain based one-wire communication bus becomes on when all connected modules output the high signal. Therefore, the bus may be turned on by module 5 which is the module performing the second declaration for the transmission intention last at the second arbitration time.

Accordingly, module 5 which is the module outputting the high signal last within the second arbitration time becomes a transmission module which may transmit next data by securing the final bus occupation.

The module which secures the final bus occupation may transmit data to another module through the one-wire communication bus 10, another module may become the receiving module and receive data from the module which secures the final bus occupation, and when destination information of the received data is not the same as an ID of another module, another module may discard the received data and when the destination information is the same as the ID of another module, another module may send ACK to the ACK section.

Figure 9:
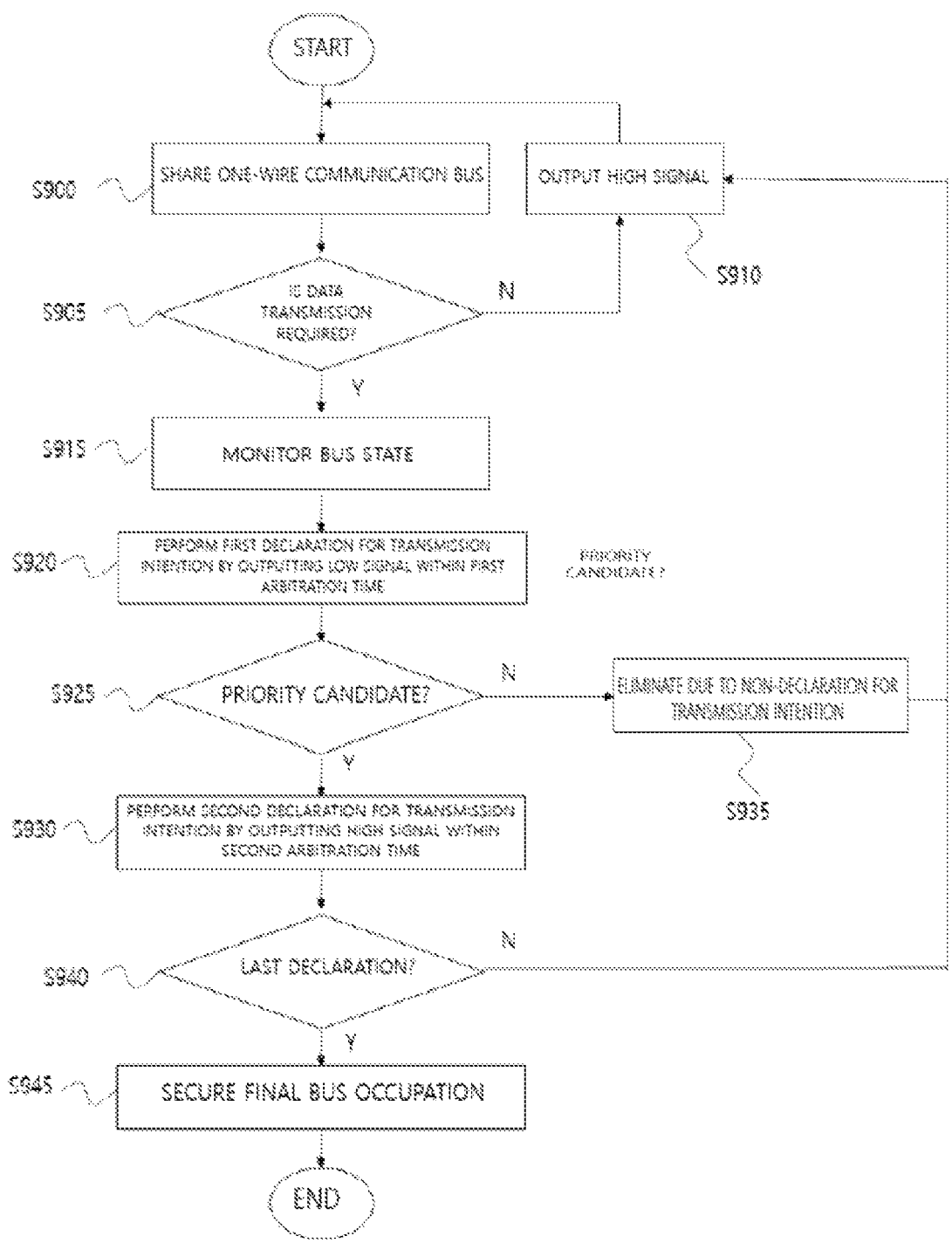
FIG. 9 is a flowchart for describing a multi-master communication method of a module assembly according to an exemplary embodiment of the present invention.

FIG. 9 is a flowchart for describing a multi-master communication method of a module assembly according to an exemplary embodiment of the present invention. In FIG. 9, the multi-master communication may be performed based on the module assembly in FIGS. 1 to 8.

The module assembly in which the plurality of modules 100a to 100n are mutually combined shares the open drain based one-wire communication bus (S900) to perform inter-module data transmission/reception. In this case, each module becomes a master module without a master-servant relationship, and an arbitration for the bus occupation is required for data transmission. In this case, an arbitration operation is made through output of the control signal for the transmission declaration, and may be performed by each module.

Upon the start of the arbitration section, all of the plurality of modules 100a to 100n connected to the one-wire communication bus 10 is configured to output the high signal. In this case, the output is determined by the external power.

At least one module (S905: Y) requiring data transmission among the plurality of modules 100a to 100n may monitor the state of the one-wire communication bus 10 (S915), and perform the first declaration for the transmission intention by outputting the low signal within a predetermined first arbitration time (S920).

Meanwhile, a module (S905: N) not requiring the data transmission maintains a high signal output (S910).

Next, when at least one module requiring the data transmission among the plurality of modules 100a to 100n determines that the key is gripped by performing the first declaration for the transmission intention when the one-wire communication bus 10 is in the on state, the corresponding module may become the transmission priority candidate.

In this case, the module (S925: Y) which becomes the transmission priority candidate among at least one module requiring the data transmission among the plurality of modules 100a to 100n may participate in the second arbitration, and a module (S925: N) which does not become the priority candidate is eliminated by non-declaration of the transmission intention (S935) and maintains the high signal output (S910).

Next, at least one module which becomes the transmission priority candidate may perform the second declaration for the transmission intention by outputting the high signal within the second arbitration time (S940).

In this case, when there is a module which outputs the low signal within the second arbitration time, the one-wire communication bus maintains the ground state, and when all modules output the high signal within the second arbitration time, the one-wire communication bus becomes the on state.

Therefore, the module which performs the second declaration last while the bus is turned on by the module (S940: Y)) that outputs the high signal last within the second arbitration time may secure the final bus occupation.

The module which secures the final bus occupation transmits data to another module through the one-wire communication bus 10, and another module becomes the receiving module and receives data from the module securing the final bus occupation to perform communication.

Accordingly, according to the present invention, there is an effect that a one-wire communication bus is shared by combining a plurality of modules having a UART interface and a transmission priority is arbitrated based on open drain characteristics to prevent a collision, thereby implementing multi-master communication.

In particular, one module can occupy the bus by performing the first arbitration and the second arbitration based on the open drain characteristics to cover a limit in processing speed, and a module which secures a bus occupation right while the bus is turned on by the module (bus occupation right securing module) outputting the high signal last upon the second arbitration transmits the data frame through the sharing bus to smoothly operate the bus occupation and the data transmission/reception.

Although the exemplary embodiments of the present disclosure have been described in detail with reference to the accompanying drawings, the present disclosure is not limited thereto and may be embodied in many different forms without departing from the technical concept of the present invention.

Accordingly, the various exemplary embodiments disclosed in the present invention are not intended to limit the technical spirit but describe the present invention and the technical spirit of the present invention is not limited by the following exemplary embodiments.

Therefore, it should be understood that the above-described exemplary embodiments are illustrative in all aspects and do not limit the present invention. The protective scope of the present invention should be construed based on the following claims, and all the technical concepts in the equivalent scope thereof should be construed as falling within the scope of the present invention.

What is claimed is:

1. A module assembly comprising:
   a plurality of modules capable of transmitting or receiving data by forming an open drain based one-wire communication bus upon mutual combination,
   at least one module requiring the data transmission or reception among the plurality of modules,
   performs first declaration for a transmission intention by outputting a low signal within a predetermined first arbitration time when at least one module is in an on state by sensing a state of the one-wire communication bus,
   at least one module performing the first declaration for the transmission intention performs second declaration for the transmission intention by outputting a high signal within a second arbitration time, and
   a module which outputs the high signal last within the second arbitration time secures final bus occupation.

2. The module assembly of claim 1, wherein the module includes
   a processor outputting a control signal for the first declaration and the second declaration when there is data to be transmitted, and
   a communication unit outputting a low signal or a high signal within an arbitration time by switching connection of the one-wire communication bus according to the output control signal.

3. The module assembly of claim 2, wherein an input/output terminal of the communication unit is configured by an open drain.

4. The module assembly of claim 2, wherein when the communication unit receives a high-level control signal from the processor, the communication unit is turned on to output the low signal.

5. The module assembly of claim 2, wherein when the communication unit receives a low-level control signal from the processor, the communication unit is turned off to output the high signal.

6. The module assembly of claim 1, wherein when at least one module outputs the low signal, the one-wire communication bus becomes a ground state.

7. The module assembly of claim 1, wherein when all of the plurality of modules outputs the high signal, the one-wire communication bus becomes an on state.

8. The module assembly of claim 1, wherein all of the plurality of modules is configured to output the high signal upon start of the first arbitration time, and
   when a one-wire bus state becomes a ground state by the first declaration, a module which does not declare a transmission intention maintains the high signal for the first arbitration time and the second arbitration time.

9. The module assembly of claim 1, wherein a module securing the final bus occupation transmits transmission data to another module through the one-wire communication bus, and
   another module discards the received data when destination information of the data received from the module securing the final bus occupation is not the same as an ID of another module.

10. The module assembly of claim 1, wherein the plurality of modules become a master module, and
    the plurality of modules transmit or receive data by using a data frame including a start section (SoF), a control section, a data section, a CRC section, an ACK section, and an arbitration section in order.

11. The module assembly of claim 2, wherein the communication unit becomes a UART communication interface.

12. A multi-master communication method of a module assembly including a plurality of modules capable of transmitting or receiving data by forming an open drain based one-wire communication bus upon mutual combination, comprising:

performing, by at least one module requiring data transmission among the plurality of modules, first declaration for a transmission intention by outputting a low signal within a predetermined first arbitration time when being in an on state by sensing a state of the one-wire communication bus;

performing, by at least one module performing the first declaration for the transmission intention, second declaration for the transmission intention by outputting a high signal within a second arbitration time; and a bus occupation step of securing, by a module which outputs the high signal last within the second arbitration time, final bus occupation.

13. The multi-master communication method of a module assembly of claim 12, wherein the plurality of modules includes a processor and a communication unit in which an input/output terminal is configured by an open drain, and the performing of the first declaration for the transmission intention includes, in each of at least one module requiring the data transmission, outputting, by the processor, the high signal for the first declaration within the first arbitration time when being in an on state by monitoring the one-wire communication bus when there is data to be transmitted, and outputting, by the communication unit, the low signal as being turned on according to the high signal output from the processor.

14. The multi-master communication method of a module assembly of claim 13, wherein the performing of the second declaration for the transmission intention includes outputting, by the processor, the low signal for the second declaration within the second arbitration time, and outputting, by the communication unit, the high signal as being turned off according to the low signal output from the processor.

15. The multi-master communication method of a module assembly of claim 12, wherein when at least one module outputs the low signal, the one-wire communication bus becomes a ground state.

16. The multi-master communication method of a module assembly of claim 12, wherein when all of the plurality of modules outputs the high signal, the one-wire communication bus becomes an on state.

17. The multi-master communication method of a module assembly of claim 12, wherein all of the plurality of modules is configured to output the high signal upon start of the first arbitration time, and when a one-wire bus state becomes a ground state by the first declaration, a module which does not declare a transmission intention maintains the high signal for the first arbitration time and the second arbitration time.

18. The multi-master communication method of a module assembly of claim 12, further comprising:

transmitting, by a module securing the final bus occupation, transmission data to another module through the one-wire communication bus; and discarding, by another module, the received data when destination information of the data received from the module securing the final bus occupation is not the same as an ID of another module.

19. The multi-master communication method of a module assembly of claim 12, wherein the plurality of modules become a master module, and the plurality of modules transmit or receive data by using a data frame including a start section (SoF), a control section, a data section, a CRC section, an ACK section, and an arbitration section in order.

20. The multi-master communication method of a module assembly of claim 13, wherein the communication unit becomes a UART communication interface.

* * * * *